Sept. 14, 1965 J. W. CASPERS 3,206,747
SEQUENTIAL DATA CONVERTER
Filed March 30, 1964 4 Sheets-Sheet 1

INVENTOR
JAMES W. CASPERS
BY
ATTORNEYS

INVENTOR
JAMES W. CASPERS
BY
ATTORNEYS

Sept. 14, 1965 J. W. CASPERS 3,206,747

SEQUENTIAL DATA CONVERTER

Filed March 30, 1964 4 Sheets-Sheet 3

INVENTOR.
JAMES W. CASPERS

BY

ATTORNEYS

INVENTOR
JAMES W. CASPERS
BY
ATTORNEYS

United States Patent Office 3,206,747
Patented Sept. 14, 1965

3,206,747
SEQUENTIAL DATA CONVERTER

James W. Caspers, San Diego, Calif., assignor to the United States of America as represented by the Secretary of the Navy Filed Mar. 30, 1964, Ser. No. 357,014
5 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

The present invention relates to a system for providing data for further processing through selection and control of data presented to the system and more particularly, to a data converter which utilizes sequential treatments on data collection and specifically, to a sequential data converter.

In many instances, manipulation of data through transformation as well as variation of data collecting processes is desired. A common application of transformation is made in an analog-to-digital conversion preparatory to a digital computation. Examples of data collecting process variations are found in sequential or adaptive treatments; a specific example being the sequential probability ratio test wherein at each stage of the process a decision to collect or not collect more data is made.

The sequential process data converter of the present invention is a data collecting process and provides a means for converting or changing the form of data in a sequential or adaptive manner.

A possible application for this type of system is in conjunction with the Track Before Detect Radar System of co-pending application, Serial No. 137,944, filed September 8, 1961, referred to hereinafter as TBD. TBD and sequential detection such as that disclosed in co-pending application, Serial No. 58,855, filed September 27, 1960, now Patent No. 3,145,379, titled "Sequential Signal Detector," for instance, separately are capable of providing fairly substantial improvements in applications such as radar. However, it would be desirable if the separate techniques, for instance, could be jointly employed such that substantial benefits are derived from both.

An object of the present invention is to provide a practical system for improving data collection.

Another object of the present invention is to provide a system for collecting data wherein the collection time is reduced.

An additional object of the present invention is to provide an optimized data collection system.

Another object of the present invention is to provide a practical and improved data collection system wherein data is presented for further processing through selection and control of data presented to the system.

An additional object of the present invention is to provide a sequential data converter for controlling and selecting data being collected.

Other objects and many of the attendant advantages of this invention will be readily appreciated as the same becomes better understood by reference to the following detailed description when considered in connection with the accompanying drawings wherein:

FIG. 1 represents a block diagram of a simple sequential converter;

FIGS. 1*a*–1*e* illustrate various modifications of FIG. 1;

Figure 1:
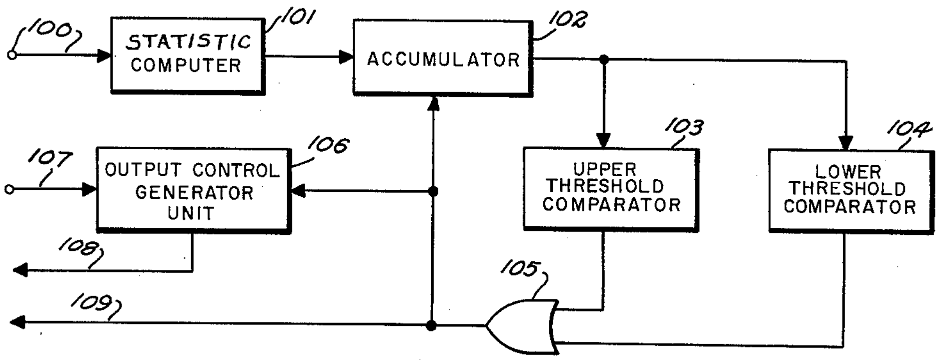

In a system such as TBD the most obvious approach would be to apply sequential analysis in the testing of data sequences for track occupancy i.e., applying sequential analysis to determine the presence or no presence of a track. The gains here may be fairly substantial in some cases and not in others. In TBD, for example, if a track detection zone of thirty miles deep running from 370 to 400 miles is used little is gained by sequential track testing. This is so in that strict fixed sample detection will call out occupancy decisions at 370 miles. This figure will be used as the standard of comparison throughout the present case.

If sequential detection were applied to this case the savings in the signal case would be important. Savings in time for noise decisions are relatively unimportant since these would not be announced and do not affect the sampling scheme. However, savings in the signal case are usually quite modest say fifty to sixty percent for typical cases. A fifty percent savings moves the average detection range from 370 miles to $370+30/2=385$ miles. Using the inverse fourth law of the radar equation, this results in about a 0.7 db gain which is rather small. It is to be understod that this is a special case and others may yield either more or less but sequential analysis appears not to give uniformly significant improvements. Furthermore, the very spirit of sequential or adaptive method is violated in that the actual data collected is not guided by the sequential detection process, only the utilization of data which will be collected in any event.

If one approaches the system from the point of controlling the collection of data rather than the sequential testing of the collected data significant savings follow. The adaptive collection of data in TBD, for example, can be effected by the technique of sequential data conversion. First, consider the function of an elementary sequential converter. The converter functions somewhat like a sequential detector. Data is collected until the statistic Z is either at or above the upper bound or at or below the lower bound of the comparator stage. At that point the converter stops collecting data and an output is provided. Rather than a yes-no or zero-one indication, as in the sequential detection system, a multi-level output is provided for further processing. Various possibilities exist for the bounds, such as $a/n$ and $b/n$ for the upper and lower bounds respectively. Here $a$ and $b$ would be the upper and lower bounds and could, but not necessarily, be given by $a=\ln a$ and $b=\ln b$ in accordance with Wald's terminology. A readout of the accumulated statistic Z or simply using the unmodified but selected input as the output are other possibilities.

Note that single decisions are not called out however, this is not meant to exclude the case where a two level output results. In any event the goal of collecting data in amounts controlled by characteristics of the collected data is achieved in the sequential data converter.

In TBD applications the operation would be performed for each range bin and this may or may not be restricted to those in the detection annulus i.e. the thirty mile zone for instance. Hence, the radar beam would be held fixed in one position until the sequential quantizer indicated sufficient data had been collected. At this point the data for each range bin is brought out for further processing. The radar beam is moved to another position and the process repeated. Processing here requires, at least in principle, parallel operation of sequential data converters. These may be operated such that the quantizer associated with the given range bin yields an output which depends only on the data used in reaching the bounds of the quantizer or a mode like forced continuation testing could be used. In forced continuation, all quantizers must exceed the in upper out lower bound before any readout is accomplished.

In that the antenna stays fixed until the last sequential quantizer is ready, the output for each range bin is determined from the total collected during the dwell period even though the sequential converters for many range bins may have exceeded their bounds. To illustrate this, if the accumulative statistic Z were read from each range bin the values would differ considerably from $a$ and $b$ for each range bin with the exception of one. The last quantizer to reach the bounds would have the value generally equal to or slightly larger than $a$ or equal to or slightly less than $b$. This is based on the assumption of small excesses over the bounds. For some range bins the readout value could be between the bounds. This would be in the case where forced continuation were not used. However, if forced continuation were used all quantizers would have to lie outside the middle zone for the first time for readout to be accomplished. In this case none of the readout values would be between the bounds $a$ and $b$.

Stated succinctly, the sequential data converter of the present invention is a device or means of converting or changing the form of data in a sequential or adaptive way. Stated another way, the system provides data for further processing through selection and control of the data presented to it.

The generic form of the sequential converter is set forth in FIG. 1 where input data is coupled in at input 100 to a statistic computer 101. The output of the statistic computer is coupled to an accumulator 102 which keeps a running sum of the statistic computer output. The output of the accumulator is coupled to an upper threshold comparator 103 and lower threshold comparator 104 the outputs of which are, in turn, coupled through an OR gate 105. The output of the OR gate 105 is coupled as a reset input to accumulator 102 and as a control function input to an output control and generate unit 106. An input to the control and generate unit 106 is coupled in on line 107 and an output is coupled out on line 108. The output of OR gate 105 also corresponds to a data collection command which is coupled out on line 109.

In operation, the input at 100 to the statistic computer would ordinarily comprise radar video. The data input to the statistic computer is modified according to the desired transformation. For example, the statistic computer 101 might compute the log of probability ratios. This might be linear as in the case of testing means of normal distributions or a squaring operation for Rayleigh statistics. The operation would be chosen to suit the intended application.

The accumulator 102 performs another operation on the output of the statistic computer. If the data input is statistically independent, this may be assumed for convenience, the accumulator keeps a running sum of the statistic computer output. The accumulated quantity might also involve both multiplicative and additive terms. An example might be the term $$\left(\frac{1}{\theta_0}-\frac{1}{\theta_1}\right)i+\ln\frac{\theta_0}{\theta_1}$$

as in the Rayleigh case where $\theta$ is the expected or true average value of the squared voltage, $\theta=\theta_0$ when no signal is present, i.e., noise only, and $\theta=\theta_1$ when a threshold signal is contained with noise. Thus at the end stage the accumulator would hold $$\sum_{i=1}^{n}\left(\frac{1}{\theta_0}-\frac{1}{\theta_1}\right)Z_i+n\ln\frac{\theta_0}{\theta_1}$$

This serves only as an illustration and the accumulator may yield an output which is any general function of all inputs Z, that is, at the $n$th stage it would be expressed generally as accumulation$=f(Z_1, Z_2, \ldots, Z_n)$ where $f$ is any desired function.

The output of the accumulator 102 is compared with upper and lower bounds by the two comparators 103 and 104 respectively. Whenever the output of the accumulator equals or exceeds the level of the upper threshold comparator an output is provided to OR gate 105. Similarly, if the accumulation is equal to or below that of the lower threshold comparator an output is also provided to OR gate 105. Both comparator outputs are operated on by the OR gate 105 or the equivalent. The OR gate serves only as a buffer to isolate any further system components. Thus, whenever either upper or lower threshold crossings are indicated an output is present from the OR gate. It necessarily follows that if neither threshold comparator is triggered, the accumulation is between the bounds, and this is also indicated by the output of the OR gate, i.e., no output.

The output of the OR gate is coupled to the output control generator 106 as a control function input and is also coupled to the accumulator 102 to reset the accumulator to the initial number. The output control and generate unit 106 may operate in any one of several modes. The chosen mode will depend upon the intended use of the converted data.

Figure 1A:
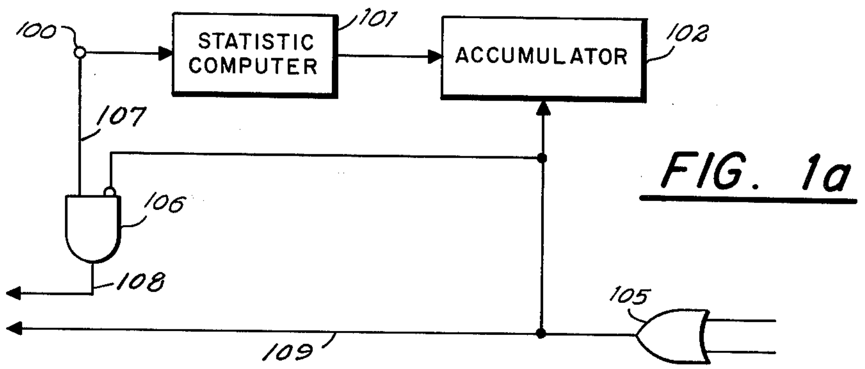

*Mode 1.*—In this mode, illustrated in FIG. 1*a* the input to the output control and generate unit on line 107 is connected to the input data source i.e. line 107 is connected to input 100. The control input from the OR gate 105 operates such that input data is provided at the output line while the OR gate is off, i.e. the accumulation lies within the bounds of the upper and lower threshold comparators 103 and 104 respectively. In this instance, the converter is used only to decide how much input data will be collected and used for further processing. When either threshold device is triggered the data flow out of the output control and generate unit 106 ceases. The accumulator is reset and a command goes to the data collection equipment on line 109 indicating that particular data collecting sequence has terminated. Any or all of the data thus selected by the converter could be used. In this instance the output control and generate unit might take the form of an AND gate in which the output of the OR gate 105 operates as an inhibit to the AND gate to cut off the flow of information from the input line 107 to the output line 108.

Figure 1B:
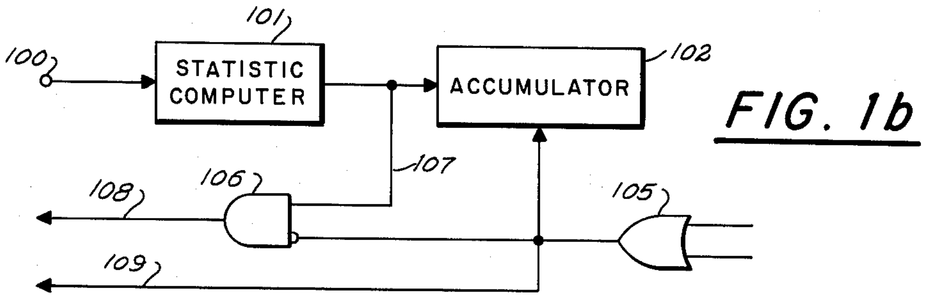

*Mode 2.*—The operation in this mode, illustrated in FIG. 1*b*, is the same as that in Mode 1 except that input line 107 is connected to the output of the statistical computer 101. If processing of the sequential data converter output on line 108 requires the same or similar computation as that carried out by the statistic computer this would be the logical operation. All or any of this data is also available for operation and any other further processing.

Figure 1C:
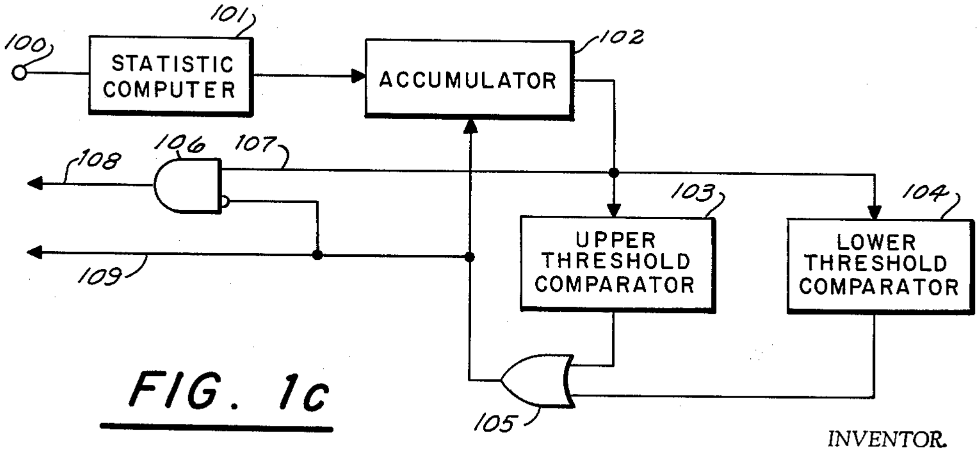

*Mode 3.*—The operation of this mode, illustrated in FIG. 1*c*, is essentially the same as that of Modes 1 and 2 except that the input line 107 is coupled to the output of the accumulator 102.

Figure 1D:
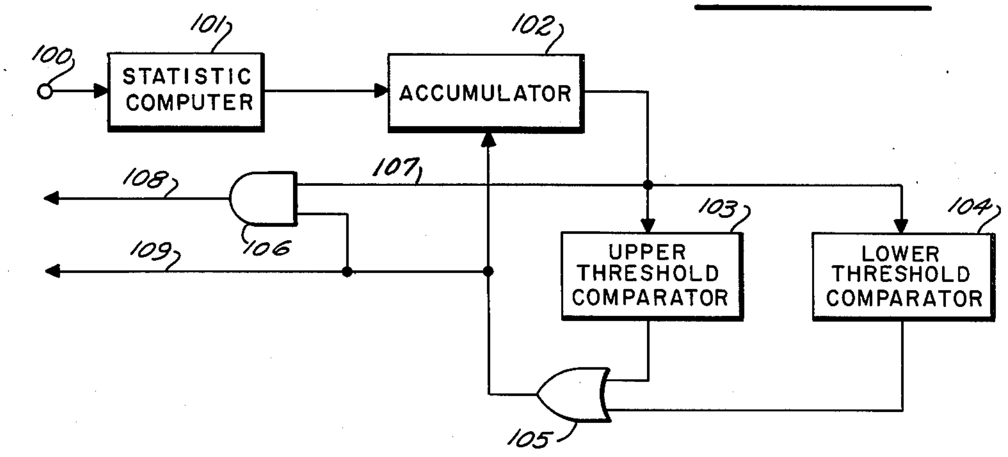

*Mode 4.*—This mode, illustrated in FIG. 1*d*, functions in the same way as Mode 3 except that the control input from OR gate 105 causes only the terminal value in the accumulator to be read out to the output line. This will occur either before the reset of the accumulator or possibly in conjunction with the reset operation. In this instance input line 107 would be coupled to the output of the accumulator 102 and the output and generator unit would take the form of, possibly, an AND gate wherein the output of 105, which corresponds to the control input to control and generate unit 106, would correspond to the enabling input for the AND gate. Thus, when either of the upper or lower threshold comparators provided an output to OR gate 105 the output control and generate unit 106 would be enabled which would read out the accumulation from accumulator 102. This operation could also be used with Modes 1 and 2 if desired i.e. the output of OR gate 105 could be used as an enabling input to an AND gate so that only the final data is coupled out on output line 108.

Figure 1E:
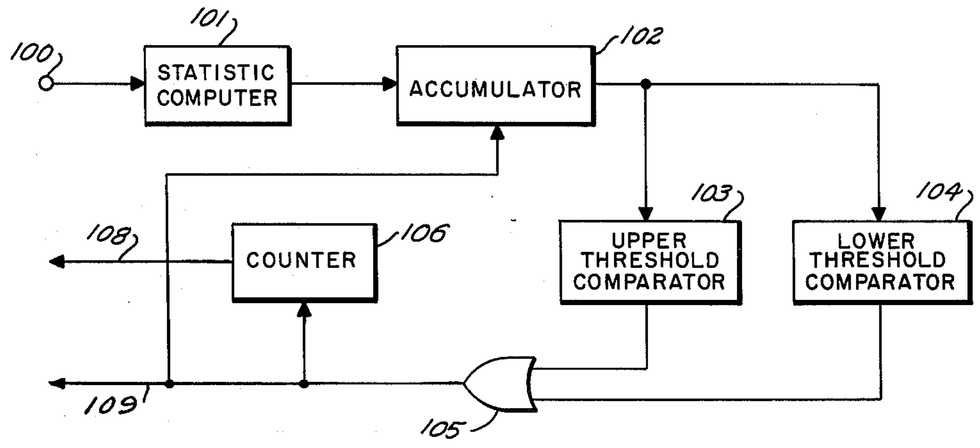

*Mode 5*.—In this mode, illustrated in FIG. 1*e*, the output control and generate unit generates an output depending on the state of the sequential data converter operation. In discrete operation this could be $a/n$ when the upper threshold is triggered or $b/n$ when the lower threshold is triggered. This also includes such cases as zero or one for the lower and upper thresholds, respectively, and would operate essentially as a sequential detector except that the operational values for misprobability and false alarm probability might well be unreasonable for a detection interpretation. In such a case the output control and generate unit 106 might include a counter which counts the crossings of the upper and lower threshold comparators respectively.

Either analog or digital operation may be employed throughout the equipment or a mixture might be used. The input to input 100, for example, could be continuous and whenever either threshold comparator produced an output a digital output would appear on the output line 108 from the output control and generate unit 106. However, the output control and generator unit might provide either digital or analog, continuous or discrete outputs for the previously discussed modes. For example, $a/t$ where $t$ is time as a continuous output might be provided in place of $a/n$ in the discrete case where $n$ is an integer representing the number of input data points.

The sequential data converters can be used in parallel operation when two or more data inputs are to be used jointly. The converters operate in any of the previously discussed modes however, a line from the OR gate 105 is brought out and labeled T. The reset and control operation line is brought out and labeled R. Connecting T and R together would yield the unmodified unit of FIG. 1. An inhibit line I from the accumulator is also brought out. A "1" on this line will stop the accumulator as well as prevent reset of the accumulator.

Figure 2:
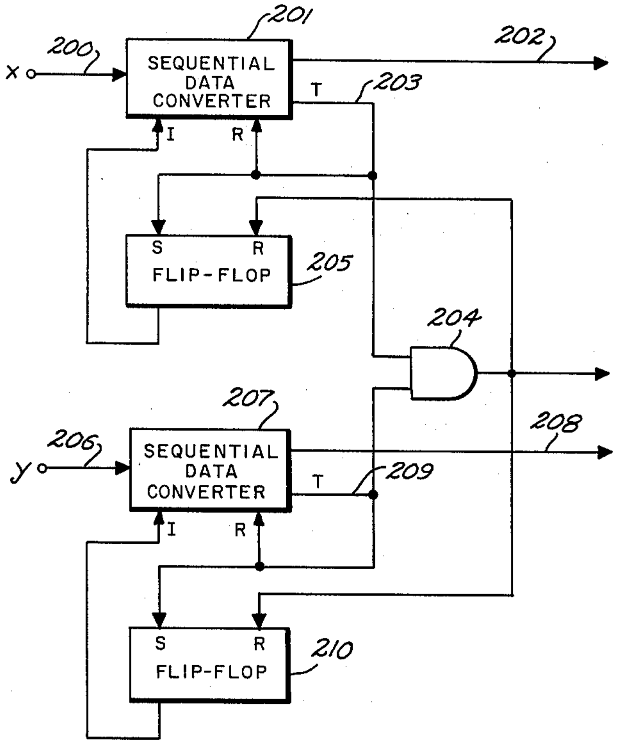
FIG. 2 is a bank of sequential data converters operating in one parallel mode.

FIG. 2 illustrates one mode of parallel operation where two or more units are connected as shown. An input is coupled in on line 200 to a first sequential data converter 201 having a data output line 202 and a T output line 203. The T output is coupled as one input to an AND gate 204; also coupled back and connected to the R line and, in addition, connected to the set side of a flip-flop 205. The set output from flip-flop 205 is coupled to the I line of the data converter 201.

Another input is coupled in at input 206 to another sequential data converter 207 which also has a data output line 208 and a T output line 209. The T output is coupled as another input to AND gate 204 and also coupled as the set input to flip-flop 210. In addition, the T output is also connected to the R line of the sequential data converter 207 while the set output of flip-flop 210 is connected to the I line of the same converter. The output of AND gate 204 is coupled back to the reset side of flip-flop 205 and the reset side of flip-flop 210 as the reset input to the two flip-flops. The output of the AND gate 204 corresponds to the data collection command for any further processing equipment.

System input data corresponding to $x$ and $y$ are brought in simultaneously or successively on lines 200 and 206 respectively. When one of the sequential data converters 201 or 207 reaches a threshold a respective T line is turned on. This resets the accumulator associated with the respective sequential data converter internally, sets the respective external flip-flop and turns the I line on. Thus, the accumulator is reset and stays that way. The T line conveys a "1" to the AND gate 204, which for purposes of convenience, has a memory unit which effectively holds the input at "1" although the T line may return to "0." When the second or last, sequential data converter reaches a threshold an operation similar to the first results. At this point all inputs to the AND gate are "1" and AND gate 204 is turned "on." This provides a data collection command and also resets the external flip-flops 205 and 210 such that the inhibit commands are taken off the I lines and a new data sequence is ready to begin. The data output may be of any of the previously discussed forms. A continuous readout of the accumulator would become static, however, as inhibit commands were generated.

Figure 3:
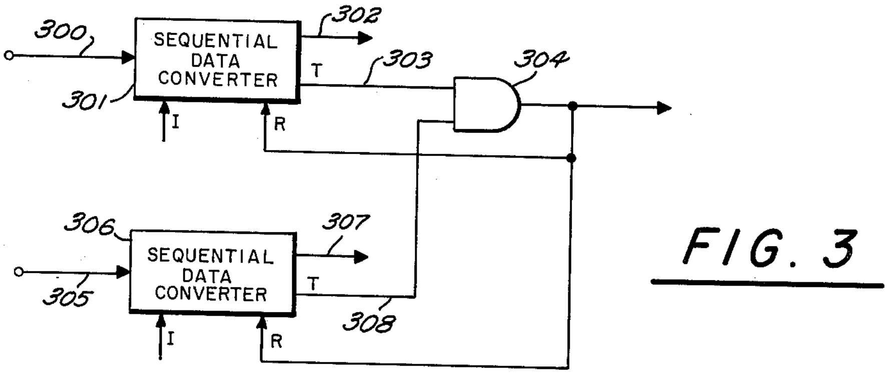
FIG. 3 is another bank of sequential data converters operating in another parallel mode.

Another mode of parallel operation is set forth in FIG. 3 wherein an input is coupled in at 300 to a sequential data converter 301 having a data output line 302 and a T line 303. The T line is connected as one input to an AND gate 304. Another input is coupled in at input 305 to another sequential data converter 306 having a data output line 307 and a T line 308. The T line provides another input to AND gate 304. The output of AND gate 304 is coupled back to the R lines of both sequential data converters 301 and 306 and also corresponds to a data collection command.

In this mode of operation the I line of the respective data converters 301 and 306 are left unconnected.

The operation differs from that of FIG. 2 in two major respects. The AND gate 304 does not have memory and hence is turned on only if all T lines are on simultaneously and the inhibit lines are not used. Thus, the accumulators within the sequential data converters 301 and 306 accumulate until the R lines are turned on by all T lines being on at the same time. Readout can be accomplished in any of the previously discussed ways. If the data outputs are restricted to "1" and "0" then this corresponds to the forced continuation use of parallel sequential detectors (upper bound giving 1, lower bound 0).

Again, standard analog or digital computer techniques are directly applicable. In digital application either dynamic or static logic or combination of both can be used. Delay lines, magnetic drums or shift registers can be employed for storage operations such as the accumulated statistic and the upper and lower threshold comparators. Techniques utilizing magnetic drum storage are especially desirable for parallel operation where time sharing may be used. In this way the sequence of statistics and upper bounds and lower bounds can be stored, one set for each converter.

Figure 4:
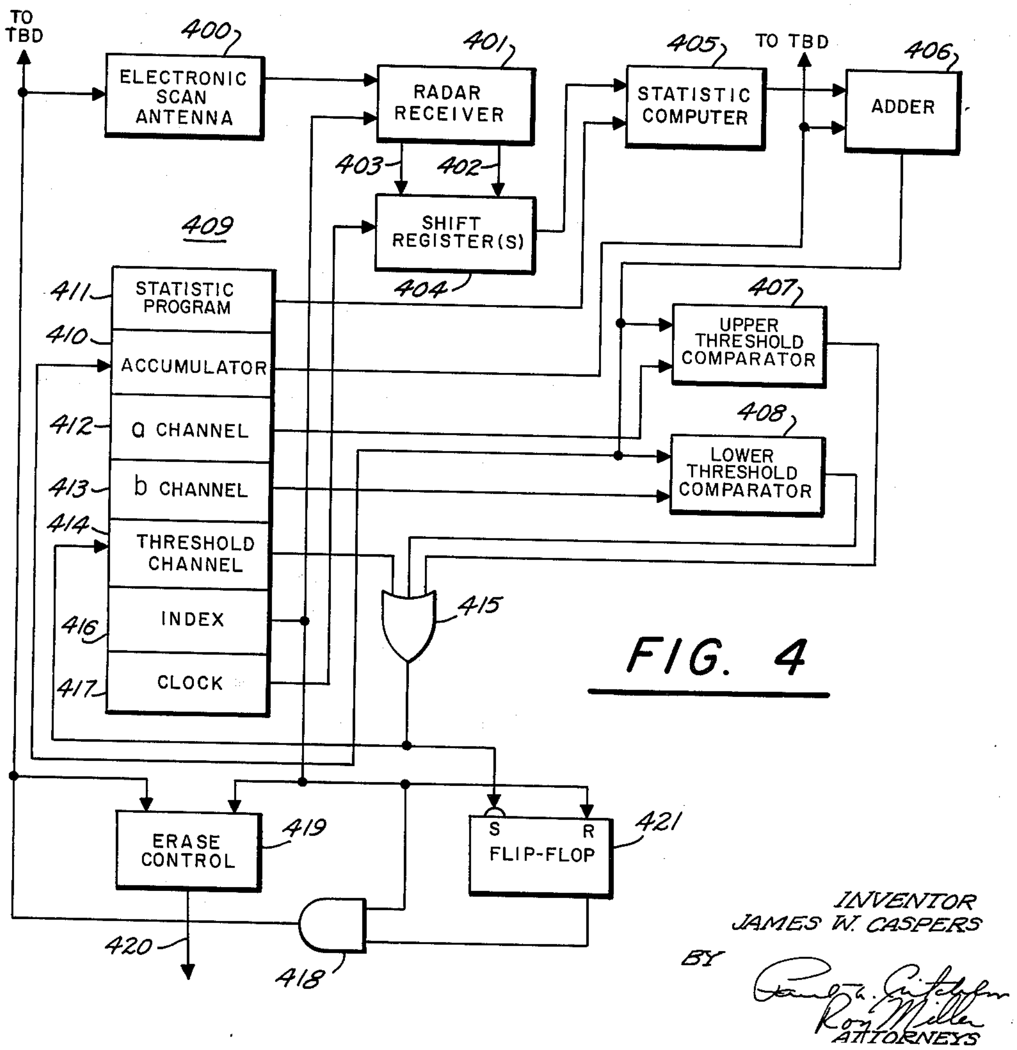
FIG. 4 is a specific application of a sequential data converter to radar operation.

In a specific application, such as that set forth in FIG. 4, radar signals are received on an electronic scan antenna 400 which contains associated beam control circuits. The output signals from the antenna are coupled into a radar receiver 401 which has a shift-in output on line 402 and a digital video output on line 403. The digital video is coupled to the input of a shift register or registers 404 and the shift-in line 402 is coupled as a shift-in input to the register 404. Digital video is coupled out of the register or registers 404 to statistic computer 405. The statistic output from the computer 405 is coupled in to an adder 406 which has an output corresponding to an accumulation plus Z which is coupled as one input to an upper threshold comparator 407 and one input to a lower threshold comparator 408. The same output from the adder 406 is also coupled into a write head on a magnetic drum 409 associated with an accumulator channel 410.

The magnetic drum 409 has a statistic program channel 411; the aforementioned accumulator channel 410; an $a$ channel 412 which is coupled as another input to upper threshold comparator 407; a $b$ channel 413 which is coupled out from a read head to the lower threshold comparator 408; a threshold channel 414 which has an output coupled through an OR gate 415; an index channel 416 which has an output coupled as an index pulse to the radar equipment 401, another output to the reset side of a flip-flop 421, the same output as one input to an AND gate 418 and the same output to an erase control unit 419; and a clock channel 417 which has an output coupled as a shift-out input to the shift register or registers 404.

The output from the upper threshold comparator 407 and the output from the lower threshold comparator 408 are also coupled to OR gate 415 and the output of OR gate 415 is coupled in to the set side of flip-flop 421.

As shown, the OR gate output is coupled through an inverter to the set line of flip-flop 421. The same output from OR gate 415 is coupled back to a readhead, not shown, associated with the threshold channel 414.

The reset output from flip-flop 421 is also coupled as another input to AND gate 418 while the output of AND gate 418 is coupled back to the erase control unit 419, also coupled to a TBD unit, not shown, and in addition coupled as the step control command for the electric scan antenna 400.

The output from the readhead associated with the accumulator channel 410 is coupled as an accumulator input to adder 406 and also coupled to the TBD unit, not shown.

The output of the erase control unit which is brought out on line 420 is coupled to all of the erase heads associated with the magnetic drum 409. These heads along with the write heads are not shown in the interest of simplicity.

With respect to FIG. 4, through the use of the magnetic drum 409 and time sharing the units associated with the magnetic drum 409 comprise or are equivalent to a bank of individual sequential data converters.

The electronic scan antenna and associated beam control circuits contained within block 400 are used in a conventional radar sense where transmission and reception of radar frequency occur. Actuation of the stop control line causes the radar beam to be stepped to the next position. A regular scan pattern is established by the beam control circuits.

The radar 401 transmits and receives RF power, the reception being accomplished through reflected echoes. The exact nature of the transmission is of little consequence as long as range information is available. A number of modulation techniques are acceptable, including pulse modulation. Radar transmissions are synchronized by the index pulse from the index channel 416 such that one set of returns is obtained for one revolution of the drum 409. Video output on line 403 is assumed to be digital in form otherwise, an A-to-D converter would be used. The shaft-in command on line 402 is generated in the radar, or elsewhere, such that the desired range interval of data is stored in the shift register 404.

The shift register 404 stores a portion of the digital video returns coupled in on line 403 as controlled by the shift-in pulses on line 402 from the radar 401. The shift register 404 may in fact be a number of registers in parallel. If, for example, three-binary-bit parallel video data were used, then three parallel shift registers would also be used. One register and serial operation could also be used, however.

Data are shifted out of the shift register 404 upon command of the shift-out pulses from the clock channel 417. Register 404 serves as a buffer storage i.e. fast shift-in, slow shift-out being the usual case.

The statistic computer 405 converts each input number, i.e., video from each range bin, into another number Z called the statistic. The exact transformation may be based on a probability ratio test or something purely arbitrary. The statistic program is applied to the statistic computer from the magnetic drum channel 411 since the transformation of video to the number Z may change with range. If all video were transformed by the same rule the input from the statistic program channel 411 would not be used but would be entered otherwise.

The adder 406 produces a running sum of the statistic computer output 405 and the accumulator channel 410 output, range bin by range bin.

Magnetic drum 409 stores in permanent or semi-permanent form the following: (1) clock pulses equal in number to the number of stages in the shift register 404. These are stored on the clock channel 417 and may be evenly spaced except for one gap which must cover the shift in interval. Otherwise a disabling circuit could be employed such that only the desired clock pulses are read out; (2) an index channel pulse on channel 416 located such that it appears after the chain of clock pulses from the clock channel 417. The time interval between the index pluse and the start of the shift-in pulses on line 402 for the shift register 404 should be related to the range at which shift-in pulses start; (3) upper bound values on an *a* channel 412 which might possibly be different for each range bin being examined. If these should be the same the *a* channel 412 would not be required; (4) lower bound values on a *b* channel 413, one for each range bin. Again, if all these should be the same the channel would not be required; (5) threshold crossings on a threshold channel 414 for each range bin under examination. A "1" entered at some range bin remains until erased.

The upper threshold comparator 407 compares the accumulated statistic for each range bin with the *a* value from the *a* channel 412 for the corresponding bin. Whenever the accumulated statistic equals or exceeds the *a* value a "1" is read out to OR gate 415.

The lower threshold comparator 408 operates in a like manner as the upper threshold comparator wherever the accumulated statistic is equal to or less than the *b* value on the *b* channel 413 for the corresponding range bin.

The erase control unit 419 provides erase commands for the accumulator and threshold channel. Erase lines and heads are left off for simplicity's sake. The output from the index channel 416 to the erase control unit 419 is used to insure exactly one complete erasure and no more.

OR gates, AND gates, flip-flops and negation operators are indicated in conventional form.

*Operation*

TBD requires the following operational conditions for this application. A radar antenna holds a beam fixed at some azimuth for some interval of time. During this interval one or more radar transmissions are made. Radar video, over some interval, running from a specified minimum range to a specified maximum range and separated into range bins is required in numerical form. One numerical representation of each range bin is used by TBD for each dwell interval. Thus, while, for example, six transmissions may occur on an antenna dwell interval only one number for each range bin is required.

Semi-permanent data is recorded on the clock, index, statistic program, *a* channel and *b* channel. The antenna 400 has just stepped to a new position and the erase control 419 is actuated to erase previous data on the accumulator channel 410 immediately after the readhead associated with the channel such that this last sequence is presented to TBD. The command used for changing the antenna position is also coupled from the AND gate 418 to the step control input of the electronic scan antenna 400. The same command is also sent to TBD and the last sequence from the accumulator is selected. At the same time, the threshold channel 414 is also erased.

The index pulse from the index channel 416, which follows the termination of the accumulator sequence alerts the radar for transmission. The transmitter fires and video data in digital form is shifted out on line 403 into the shift register or registers 404. Data from the last *k* shift pulse remains in the shift register 404. These *k* data represent the *k* range bins in the desired range interval.

Next, a burst of clock pulses from clock channel 417, *a* channel data from *a* channel 412, *b* channel data from *b* channel 413, and statistic program data from statistic program channel 411 appear at the readheads, not shown, on the magnetic drum 409. At this point the accumulator channel 410 and threshold channel 414 are empty. The first clock pulse shifts the nearest range bin data into the statistic computer 405. Coincident with this shift is the first statistic program data which causes the statistic computer to perform a specified arithmetic transformation to obtain the first statistic data. This is coupled through the adder and is added to 0 since the accumulator channel is clear. Hence, the first statistic data is impressed upon the accumulator channel 410 in virtual coincidence with the first clock pulse. The first statistic data is also presented to the upper and lower comparators 407 and 408 respectively. At the same time the first *a* data from *a* channel 412 is presented to the upper threshold comparator 407 and the first *b* data from the *b* channel 413 is presented to the lower threshold comparator 408.

The flip-flop 417 is in the reset condition. If either threshold comparator is triggered the OR gate fires. The output of the OR gate is negated and applied to the set input of the flip-flop 417. The flip-flop is only set if neither threshold comparator is triggered and also if no output results from the threshold channel 414.

The above operation continues until all *k* range data are processed and recorded on the accumulator channel 410. The statistic is computed for each range bin, range bin by range bin according to the statistic program on channel 411. The threshold channel 414 will hold pulses for any range bin for which either threshold comparator was triggered. If one or the other threshold comparator has been triggered for each range bin then the following occurs. The flip-flop at this point has not been set and remains in the reset condition. The next index pulse flows through the AND gate 418, the antenna step control is initiated, TBD is directed to use data coming from the accumulator 410 and the erase control 419 is energized for one complete revolution of the magnetic drum 409. However, if on the first pass of the drum there are one or more range bins for which a threshold comparator 407 or 408 is not triggered the flip-flop 417 is set. When the flip-flop is set the index then only initiates the next radar transmission. This is so in that there will be no output from the reset line of flip-flop 421 to enable AND gate 418.

After the next transmission, the same antenna beam position, digital video data is shifted into and held in the shift register as before. On the first clock pulse the nearest range bin data is shifted into the statistic computer as is the first statistic program data. The statistic is computed, sent to the adder and added to the first range bin statistic stored from the previous transmission. This sum is reentered into the accumulator channel 410 in the position corresponding to the first range bin. This same sum is also presented to the comparators 407 and 408 where comparisons with the first *a* and *b* data are made. The output of the threshold channel 414 is coupled to the OR gate 415 along with both threshold comparator outputs. An assertion from any one of the three sources will prevent the flip-flop from being set. If one or more range bins on the threshold channel, upper comparator, and lower comparator outputs are all 0 the flip-flop 417 is set and the following index pulse again just initiates a radar transmission.

This entire process continues with the accumulator channel 410 storing the accumulated statistic each time. The threshold channel holds "1's" for each range bin where a threshold comparator has been triggered. On the first pass of the drum where each of the *k* range bins holds a "1" on the threshold channel 414 or a "1" is obtained from one of the threshold comparators the flip-flop 417 is not set. The next index pulse, in addition to initiating the next radar transmission, causes the radar beam to step to the next position, commands TBD to use the last sequence in the accumulator and initiates the erase operation of the accumulator channel 410 and threshold channel 414.

Another mode of operation could be achieved by omission of the threshold channel 414. The operational sequence for antenna beam position would then terminate when, for the first time in one pass of the drum for each range bin a threshold comparator is triggered. This is the forced continuation mode.

Through the use of the present system data being collected is selected and controlled through the use of sequential analysis rather than having data collection occur in a fixed sequence. In addition, a means is provided for converting or changing the form of data in a sequential or adaptive manner.

Obviously many modifications and variations of the present invention are possible in the light of the above teachings. It is therefore to be understood that within the scope of the appended claims the invention may be practiced otherwise than as specifically described.

What is claimed is:

1. A sequential data converter comprising;

input means adapted for receiving an input number;

means for converting said input number into another number called the statistic number;

accumulator means operatively receiving the output from said means for converting said input number adapted to keep a running sum of the output from said means for converting said input number;

upper threshold comparator means operatively connected to the output of said accumulator means and having an upper bound;

lower threshold comparator means operatively coupled to the output of said accumulator means and having a lower bound;

said upper threshold comparator means and said lower threshold comparator means being operative to provide an output when the output from said accumulator means exceeds either of said upper or lower bounds;

control means operatively coupled to the output of said upper and lower threshold comparator means for selecting and controlling data being collected as determined by said output from either of said comparator means.

2. A sequential data converter as set forth in claim 1 and further including;

receiver means operatively coupled to said input means for providing input video data corresponding to said input number.

3. A sequential data converter as set forth in claim 1 wherein;

said means for converting said input number into another number comprises a statistic computer; and said computer is programmed to provide a transformation from the input video to said another number called the statistic number.

4. A sequential data converter for providing data for further processing through selection and control of data presented to it comprising;

input means adapted for receiving a video input corresponding to an input number;

converter means operatively connected to said input for converting said input number into another number corresponding to a statistic number;

accumulator means operatively connected to said converter means for providing a running sum of the output from said converter means;

upper threshold comparator means operatively connected to the output of said accumulator means and having a predetermined upper threshold;

lower threshold comparator means operatively coupled to the output of said accumulator means and having a predetermined lower threshold;

said upper threshold and lower threshold comparator means being operative upon one of said upper and lower threshold being exceeded to produce an output;

control means operatively receiving said output from said upper and lower threshold comparator means; and said control means being operative in controlling and selecting data being collected for further processing.

5. A sequential data converter as set forth in claim 4 further including;

a scanning antenna having beam control circuits;

said receiver means comprises radar receiver means;

said radar receiver means receiving an input from said scanning antenna having beam control circuits; and said control means being operative to control the scanning of said antenna and also being operative to control the transmissions of an associated radar.

References Cited by the Examiner

UNITED STATES PATENTS 3,171,119 2/65 Nuese et al. ______________ 343—5

CHESTER L. JUSTUS, *Primary Examiner.*

KATHLEEN H. CLAFFY, *Examiner.*